(12) United States Patent
Tiernay et al.

(10) Patent No.: US 7,016,311 B2
(45) Date of Patent: Mar. 21, 2006

(54) MULTIPLE PROTOCOL TRANSPONDER

(75) Inventors: Robert W. Tiernay, Oakville (CA); Weimin He, Richmond Hill (CA)

(73) Assignee: Mark IV Industries Limited, Mississauga (CA)

(*) Notice: Subject to any disclaimer, the term of this patent is extended or adjusted under 35 U.S.C. 154(b) by 851 days.

(21) Appl. No.: 09/829,237

(22) Filed: Apr. 9, 2001

(65) Prior Publication Data

US 2001/0050922 A1 Dec. 13, 2001

(30) Foreign Application Priority Data

May 1, 2000 (CA) .................................... 2307361

(51) Int. Cl.
H04L 12/26 (2006.01)
H04B 7/212 (2006.01)
H04J 3/00 (2006.01)

(52) U.S. Cl. ...................... 370/252; 370/337; 370/347; 370/466

(58) Field of Classification Search ................. 340/10; 370/252, 465, 466, 337, 347
See application file for complete search history.

(56) References Cited

U.S. PATENT DOCUMENTS

| 4,870,419 | A   |   | 9/1989 | Baldwin et al. |
|-----------|-----|---|--------|----------------|
| 5,132,687 | A   |   | 7/1992 | Baldwin et al. |
| 5,164,732 | A   |   | 11/1992| Brockelsby et al. |
| 5,196,846 | A   |   | 3/1993 | Brockelsby et al. |
| 5,425,032 | A   |   | 6/1995 | Shloss et al. |
| 5,771,021 | A   |   | 6/1998 | Veghte et al. |
| 5,940,006 | A   |   | 8/1999 | MacLellan et al. |
| 6,084,530 | A   | * | 7/2000 | Pidwerbetsky et al. .. 340/10.32 |
| 6,577,229 | B1  | * | 6/2003 | Bonneau et al. ......... 340/10.41 |
| 6,580,358 | B1  | * | 6/2003 | Nysen ..................... 340/10.41 |

* cited by examiner

Primary Examiner—John Pezzlo
Assistant Examiner—Gregory B. Sefcheck
(74) Attorney, Agent, or Firm—Lipsitz & McAllister, LLC

(57) ABSTRACT

A multi protocol transponder for a communications network having a antenna for receiving a first RF signal transmitted according to a communications protocol and a detector for identifying the communications protocol from the first RF signal. A protocol controller is provided for executing the identified communications protocol to generate a second RF signal. Thereafter an antenna transmits the second RF signal according to the communications protocol either by active transmission or modulated backscatter. The transponder may implement a variety of wide area and localized lane based protocols for Automatic Vehicle Identification systems such as CVO and Toll systems.

23 Claims, 3 Drawing Sheets

MULTIPLE PROTOCOL TRANSPONDER

BACKGROUND OF THE INVENTION

1. Field of the Invention

The present invention relates to short range communications networks between a reader and a transponder and more particularly to a transponder for operation in a variety of such networks implementing different communications protocols.

2. Description of the Prior Art

Communications systems for the remote identification of objects by electronic means are known in the art. The purpose of such systems may be Automatic Vehicle Identification (AVI) for Commercial Vehicle Operations (CVO) and for Electronic Toll and Traffic Management (ETTM) applications. The objectives of CVO services are to increase productivity of commercial vehicle regulatory agencies and commercial vehicle operators, and to enhance the safety of CVO drivers and vehicles. Examples of CVO services include automated permit and registration acquisition, vehicle performance monitoring, and hazardous materials incident response. ETTM allows drivers to pay highway tolls without stopping, and allows traffic managers to use transponders as probes in high traffic volume areas to facilitate incident detection. These systems provide a two-way communications means between a reader and a transponder (or "tag"). The tag can store information of interest such as identity, fuel level, time of day, cargo ownership and vehicle type, etc. This information may change and be updated as conditions change. Subsequent reading of the tags can keep those persons monitoring the vehicle, cargo or container etc. appraised of the conditions.

Such communication systems use RF signals to communicate between a reader device, such as fixed Roadside Equipment (RSE), and a mobile transponder generally fixed to the object of interest. Some systems permit both "read" and "write" capabilities, permitting a reader to access stored data in the transponder and permitting the transponder to update the data stored therein in response to signals from the reader (eg. to write the time and place of entry onto a toll highway in the transponder useful for calculating tolls based on distance and time-of-day travel).

In operation, the reader sends a RF signal to the transponder. An antenna at the transponder receives the signal from the reader and responds thereto according to one of many developed protocols. The transponder produces a series of signals in conjunction to its identity code, providing the reader with data stored in the transponder which the reader decodes.

Reader-transponder technologies divide into two basic physical modes of operation: active transmission (Active) or modulated backscatter (Backscatter). Active systems utilize a transponder with an active transmitter which responds to interrogations from the reader with an active modulated RF response signal generated by the transponder. In contrast, Backscatter systems utilize a transponder that responds to a continuous wave (CW) RF signal generated by the reader. The tag responds by modulating the continuous wave, electrically switching the tag's antenna from a reflective to an absorptive characteristic according to the tag's modulating signal. While Backscatter systems are typically limited to using amplitude modulation for the response, Active systems may use phase, frequency or amplitude modulation.

As a result of the frequency limitations of Active systems and the fact that such systems cannot employ a multiple number of frequencies within an assigned band, interference between closely located systems is typically controlled by Time Division Multiple Access (TDMA) of the closely located systems. This contrasts to the ability of Backscatter systems to use a number of possible frequencies within an assigned band with less risk of interference between adjacent capture zones. Backscatter systems, therefore, are generally not closely synchronized in time. Both systems however can employ time and frequency multiplexing to control interference.

A natural consequence of these physical differences is that the communications protocol that is most commonly used for either system is also characterized as either Asynchronous or Synchronous. Backscatter systems are typically isolated primarily in frequency instead of time, hence tolerating communication lengths that are uncontrolled and operating asynchronously. Active systems are primarily isolated in time instead of frequency, hence operating in synchronous mode with tightly controlled packet lengths.

Among the developed communications protocols are:
1) various public TDMA protocols for Wide Area or Lane Based operations (See too, PS111-98 Standard Provisional Specification for Dedicated Short Range Communication (DSRC) Physical Layer Using Microwave in the 902 to 938 MHz Band, AMERICAN SOCIETY FOR TESTING AND MATERIALS, ASTM Subcommittee E17.51 on Dedicated Short Range Communication, West Conshohocken, Pa.);
2) State of California Code of Regulation (CALTRAN) Title 21 (T21) protocol (eg. http://www.dot.ca.gov/hq/traffops/elecsys/title21/docs/t21updat.htm); and
3) proprietary IAG (northeastern Interagency Group (IAG) members (NY, NJ, PA, DE)) protocols. See for example, U.S. Pat. No. 4,870,419 of Baldwin et al. issued Sep. 26, 1989 entitled, "Electronic Identification System"; U.S. Pat. No. 5,132,687 of Baldwin et al. issued Jul. 21, 1992 entitled, "Electronic Identification System"; U.S. Pat. No. 5,164,732 of Brockelsby et al. issued Nov. 17, 1992 entitled, "Moving Vehicle Identification System with High Gain Antenna"; and U.S. Pat. No. 5,196,846 of Brockelsby et al. issued Mar. 23, 1993 entitled, "Moving Vehicle Identification System".

U.S. Pat. No. 5,425,032, of Shloss et. al, Jun. 13, 1995, entitled "TDMA Network and Protocol For Reader-Transponder Communications and Method" also discloses a TDMA protocol.

For TDMA protocols, communications are initiated by a first RF signal transmitted by a reader to a transponder at a defined frequency. In a quiescent mode, the transponder monitors the frequency for incident RF energy of about −30 dBm. The transponder receives and decodes the signal to determine if the signal encodes Manchester Data. Thereafter, the transponder looks for a Frame Control Message (FCM) within the signal received according to the protocol. Once a FCM is determined, the tag moves to an active mode and engages in TDMA protocol communications.

For the T21 protocol, in a quiescent mode, the transponder monitors the defined frequency (eg. 915±13 MHz) for a RF wake up signal according to the protocol (eg. 33 microseconds of unmodulated RF) at a minimum RF level. RF presence of at least about −22 dBm may indicated T21 signals are present. Thereafter, the transponder awakes and actively searches for a T21 Interrogation or polling message and responds appropriately as a passive Backscatter transponder.

For IAG protocols, the transponder sniffs the defined RF band for an IAG trigger signal and wakes up to engage as an active IAG transponder. IAG trigger signals are similar to T21 triggers but differ in length and are not followed by a T21 polling message. In IAG communications, the transponder responds promptly upon receipt of a wake signal, without waiting for a polling message. The RF level required to initiate IAG operation is higher than the RF level to engage T21 activity, which is in turn higher than the RF level to initiate TDMA activity.

Comprehensive standards governing the communications between the transponder and reader, and the message sets on the transponder, do not exist. Therefore, interoperability does not exist between the equipment of different manufacturers. Interoperability, in this case, is the ability of a roadside reading or interrogation device of one manufacturer to meaningfully process the data from any given transponder mounted in a vehicle. The communications industry has been unable to agree upon a path for standardization.

Vehicles, for example, which traverse large geographic areas may be required to respond to a multitude of AVI implementations for electronic toll collection or other commercial vehicle operations purposes and can only do so by selecting the transponder appropriate to the jurisdiction and mounting the transponder to the vehicle. As the vehicle moves from one jurisdiction to another, the operator is required to select from a supply of transponders, mount the appropriate one and shield any others from being inadvertently activated and possibly interfering with the transmissions.

A dual protocol transponder implementing both IAG and TDMA Wide Area protocols (sold under the trademark Fusion of Mark IV Industries) is known in the art. This transponder provides only two synchronous and actively transmitted protocols. The transponder combines the operation of two separate transponders implementing the TDMA and IAG protocols respectively by employing separate protocol detectors and a single communications controller operable according to the detected protocol. For TDMA operation, when in a quiescent mode not engaged in communication with a reader according to a selected protocol, the transponder periodically wakes up and looks for (i.e. samples) RF above a TDMA baseline signal strength and within a designated frequency range. If such an RF signal is detected, the transponder examines the signal to see if it is a TDMA protocol signal. If the detector finds an expected Frame Control Message encoded in the signal, the transponder enters TDMA communications with the reader and otherwise continues monitoring for appropriate signals. Employing a separate detector in parallel for IAG protocol detection, the transponder continuously monitors for RF signals above an IAG baseline. If such a signal is detected, the transponder determines if the signal is an IAG trigger and enters IAG protocol communications appropriately.

Such a transponder has limited functionality in that it does not provide for both active and backscatter communications ability. Moreover, in employing parallel detection strategies with separate detection hardware, the transponder is not efficiently scalable to increased protocol implementation.

It is also impractical to install multiple RSE readers implementing different protocols in an attempt to read different transponders implementing different protocols. Each of the reader protocols is designed to utilize the available time efficiently and makes no allowance for sharing the RF spectrum with incompatible RF protocols that could result in RF interference at the transponder or at the reader. Any such attempt can only operate with the penalty of considerable degradation.

Typically, each AVI system uses different identification means for the transponder. In the absence of compatible identification, the opportunity for general mobility of a transponder is further restricted.

It is desirable that a single transponder be capable of responding to a plurality of communications network protocols in a manner that overcomes the limitations of the prior art.

SUMMARY OF THE INVENTION

The desire is addressed by a multi protocol transponder for a communications network and a method of the present invention. The transponder according to the invention comprises an antenna for receiving a first RF signal transmitted according to a communications protocol and a detector for identifying the communications protocol from the first RF signal. A protocol controller is provided for executing the identified communications protocol to generate a second RF signal. Thereafter an antenna transmits the second RF signal according to the communications protocol. In a preferred embodiment, transmission may be by either by active transmission or modulated backscatter through a shared antenna.

The transponder may implement a variety of wide area (eg. TDMA ASTM V6 Wide Area) and localized Lane Based protocols (eg. IAG, T21 and TDMA Lane Based ASTM V7) for Automatic Vehicle Identification systems such as CVO and Toll systems. The detector may identify the communications protocol by measuring the energy level of the first RF signal and if the measured level exceeds a threshold trigger level for the protocol, testing the RF signal for communications protocol indicators. A single unique universal transponder ID for use in all protocols is provided.

DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DESCRIPTION OF THE INVENTION

Figure 1:
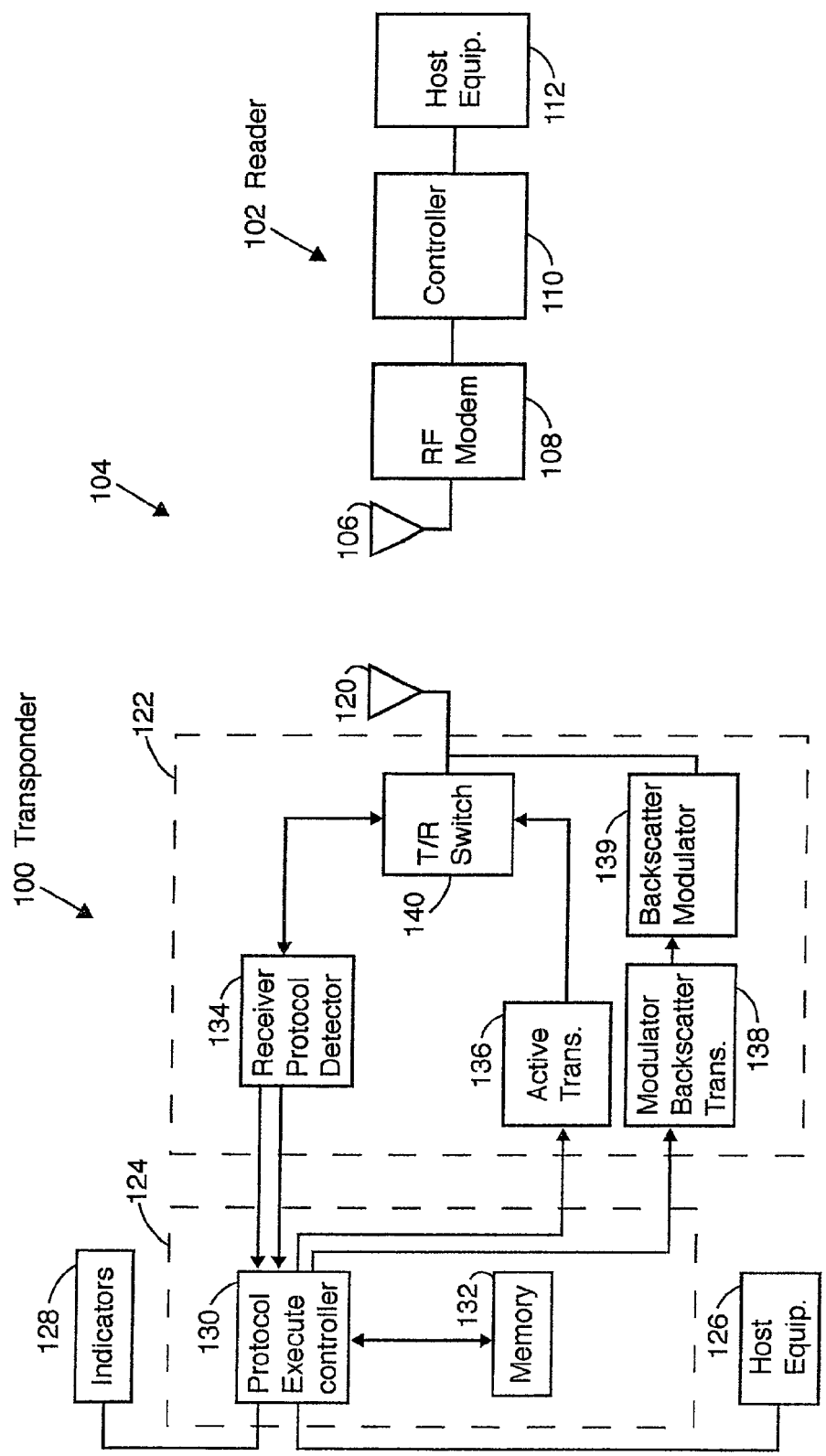
FIG. 1 is a schematic diagram of a short range radio communication network incorporating a transponder according to the present invention.

With reference to FIG. 1, the invention is embodied in a transponder 100 of the type used in short range RF communications with a reader 102 in a reader-transponder communications network 104. Such systems may be useful to automatically identify vehicles on a roadway, reducing restrictions on traffic flow. Readers 102 are typically stationary, set in a suitable location as Roadside Equipment. Transponder 100 is typically mounted in a vehicle that passes within the range of the reader 102 to permit communication and identification of the transponder. It is understood that the term vehicle has a wide application including, a motorized carrier such as a truck, motorcycle, automobile, ship or a transported carrier such as a cargo container. Alternately, the transponder may be stationary and a mobile reader brought within the range of the transponder, for example where an automobile may be parked and a hand held reader drawn near for communications.

Communications between the transponder and reader are governed by a communications protocol that provides the rules of communication. Many protocols exist for such communications and include public TDMA protocols for wide area and single lane communications. In wide area or open road communications, a single reader may communicate with vehicle transponders is several lanes without traffic restrictions. Other protocols are State of California Code of Regulation (CALTRAN) Title 21 (T21) protocol and proprietary IAG protocols.

A simplified diagram of the network 104 that discloses transponder 100 and reader 102 is shown in FIG. 1. Generally, reader 102 comprises an antenna 106, a RF modulator/demodulator 108 and a digital controller 110. Reader 102 is shown connected to an optional host computer 112.

Transponder 100 comprises an antenna 120 and RF modulator/demodulator 122 and a digital controller 124. An optional host computer 126 is also shown connected to the controller 124 as are indicators 128. The optional host computer 126 of the transponder may perform a variety of functions such as computer support and/or memory storage capacity to a protocol controller 130. The host computer 126 may assist to provide an interface to other devices such as Smart Cards, digital recording devices, display devices or the like (all not shown). The indicators 128 may serve to notify the vehicle operator to perform some task, such as, to direct the vehicle to or away from a vehicle inspection station or to note that the balance of a debit account in an attached smart card is below a threshold. Indicators 128 may include LEDs, beepers, etc.

Typically, transponder antenna 120 is located integrally with the transponder 100 and reader antenna 106 is located remote from the reader. In the preferred embodiment, each antenna acts in both a receive mode and transmit mode for RF radiated energy. In the receive mode, each antenna receives and converts radiated energy to a RF voltage signal. In the transmit mode, the reader antenna 106 converts a RF voltage signal to radiated energy. As discussed further below, in the transmit mode, the transponder antenna 120 may convert a RF voltage signal generated under the control of the digital controller 122 to actively transmit radiated energy. Alternatively, according to the protocol sensed by the receiver/protocol detector 134, the transponder antenna 120 may be controlled to modulate a continuous wave transmitted by the reader antenna 106 in a modulated backscatter implementation. Additional control circuitry for Frequency Shift Keying (FSK) sub-carrier modulation may also be used in a backscatter mode.

The RF modulator/demodulator sections 108 and 122 respectively serve to demodulate received RF voltage signals provided by the respective antennas 106 and 120. When transmitting, the RF modulator/demodulator sections 108 and 122 respectively serve to modulate a RF voltage signal prior to being transmitted to the antennas 106 and 120 respectively.

The digital controllers 110 and 124 are each suitably programmed to provide a protocol structure for executing the timing and decision making logic steps necessary to communicate according to the protocol. As discussed more fully below, the transponder controller 124 includes multiple protocol structures to communicate in a variety of protocol networks.

Operation of the transponder 104 will now be discussed with reference to FIGS. 1 and 2. The transponder enters the transmission range of the reader in a quiescent mode Block 200, not engaged in communication with a reader. Radiated energy is received at the antenna 120 and converted to a first RF voltage signal. The first RF voltage signal is presented to a transmit/receive switch 140 located within the RF modulator/demodulator section 122. In the receive mode, the switch 140 routes the first RF voltage signal to a receiver/protocol detector 134. Here, the receiver/detector 134 commences to identify the communications protocol by determining the characteristics of the first RF voltage signal.

Figure 2:
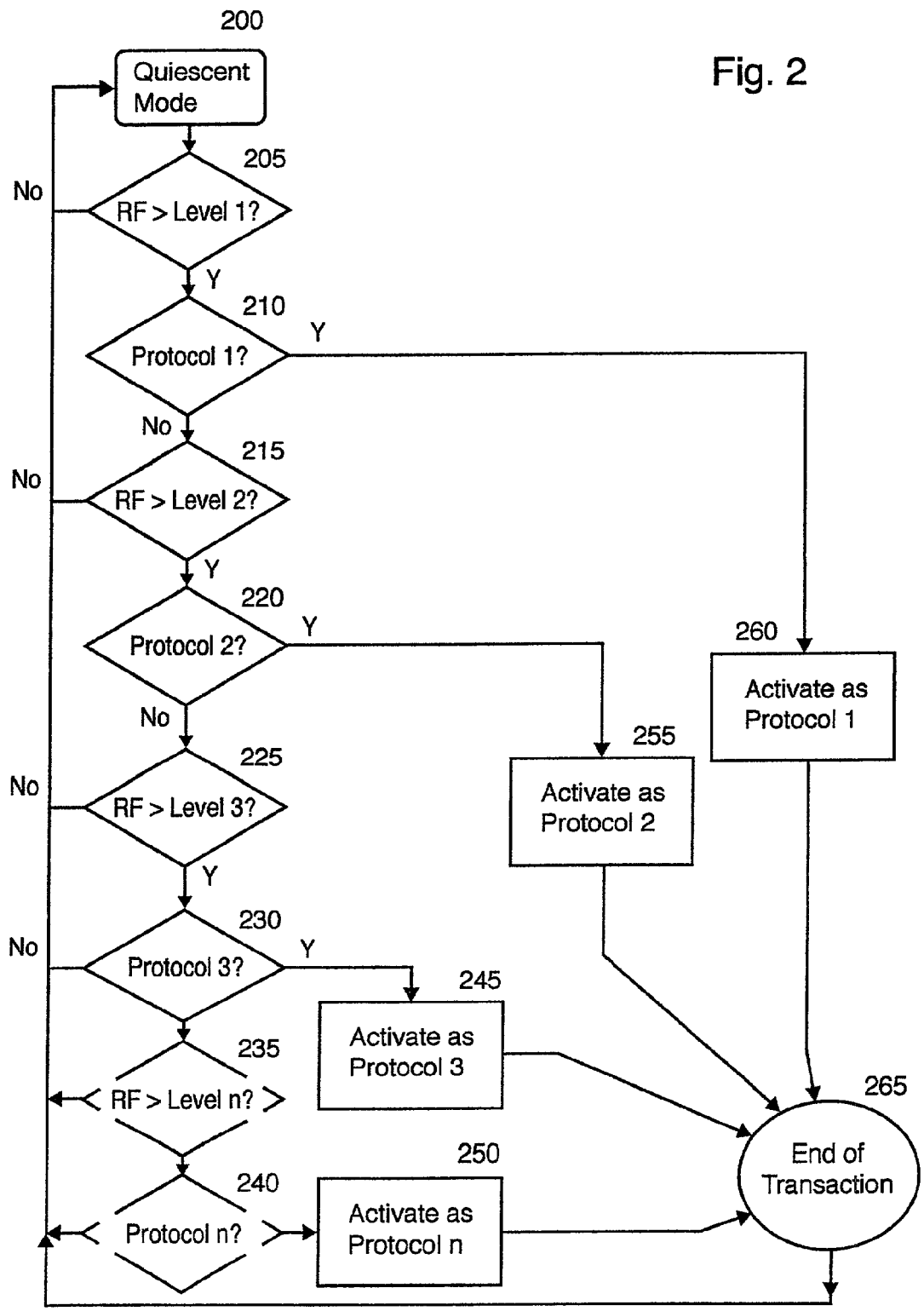
FIG. 2 is a simplified block diagram illustrating a protocol selection.

In the preferred embodiment, the transponder is configured to implement N communications protocols, three of which are TDMA Wide Area protocol, T21 and IAG referred to as Protocol 1, Protocol 2 and Protocol 3 in FIG. 2. To select which of the N protocols to use in communications with the reader, upon receipt of the first RF signal, the receiver/protocol detector 134 measures the radiant energy level of the first RF voltage signal to determine whether the signal meets a threshold trigger level for any of the plurality of communications protocols understood by the transponder. If the RF level exceeds a threshold indicated as Level 1, Block 205, (greater than about −30 dBm for TDMA Wide Area protocol), the receiver/protocol detector 134 tests the received signal for communications protocol indicators for Protocol 1.

The receiver/detector 134 demodulates the carrier wave (typically amplitude modulated) of the first RF voltage signal to determine if the signal is a demodulated baseband (Manchester) split-phase coded signal. If such is the case, the transponder partially awakens and the protocol detector looks for a Frame Control Message (FCM) signifying TDMA communications from reader 102. If the FCM exists, then the detector selects Protocol 1, Block 260, as the identified communications protocol and notifies the digital controller 124 accordingly to use the protocol, Block 265. Once a protocol is selected, the transponder 100 only responds according to the identified protocol and does not respond to any other protocol triggers. The transponder 100 may revert to a quiescent mode after the expiry of a timer (eg. about 300 ms) in the absence of minimum RF.

If expected communications protocol indicators are not present for Protocol 1, the detector 134 continues to attempt to identify a protocol from the first RF signal. If the RF level of the signal is above a threshold indicated as Level 2 in Block 215 (greater than about −22 dBm for T21), the receiver/protocol detector 134 tests the received signal for communications protocol indicators for Protocol 2, Block 220. The receiver/detector 134 examines to see if the RF signal is a wake up pulse of sufficient duration followed within a short period by a properly coded Interrogation or polling message, using Unipolar ASK (Manchester Encoded) modulation, in accordance with T21 specifications. If such is the case, the detector 134 selects Protocol 2, Block 255.

Similarly, if Protocol 2 is not detected, RF Level 3, Block 225, (for example greater than about −10 dBm) is examined and as appropriate, the signal is reviewed for indicators for Protocol 3, Block 230. Protocol 3 is selected in the presence of appropriate indicators in Block 245. Such indicators are the detection of two IAG wake-up triggers in about a 40 msec duration in the absence of a T21 polling message. In a like way, up to N protocols may be determined (Blocks 235, 240 and 250).

Of course, for protocols having the same RF level triggers, they may be handled by looking to differences in communications protocol indicators, such as different Frame Control Messages for different TDMA protocols, to distinguish between protocols. Both the T21 and public TDMA Lane Based (ASTM V6) protocols have the same RF level trigger of greater than about −22 dBm.

It may be necessary that the first RF signal from the reader 102 comprise a set of RF signals (either repeated signals or different signals) for the transponder 100 to determine the protocol. For example, if the transponder 100 receives an incomplete signal, the transponder 100 may be required to receive a repeated reader 102 transmitted signal to obtain sufficient information to determine the protocol. Under many protocols, the first RF signal is repeated frequently to rapidly initiate communications between a reader 102 and a transponder 100. In other protocols, the initiating or first RF signal comprises a set different signals such as a wake up and an Interrogation signal.

As well as selecting the protocol, the receiver/detector 134 provides an analog-to-digital (A/D) conversion of the RF signal as is well known. The demodulated signal is converted to binary data bits and provided to the digital controller 124 together with clock synchronization and an indication of the protocol identified by the receiver/detector 134. The digital controller 124 comprises a protocol controller 130 and a memory 132.

The protocol controller 130 decodes the binary data bits and executes the protocol structure which controls the timing and decision making logic steps of the digital controller 124. Examples of the decision making logic steps or processes performed include timing, message slot selection, memory input/output and transmit/receive control as is well known in the art. For example, T21 is an asynchronous half duplex protocol with downlink (reader to transponder) data ASK (Manchester Encoded) at 600 kBps and uplink (transponder to reader) data FSK encoded at 300 kBps. TDMA and IAG operate downlink and uplink at 500 kBps. A multi protocol transponder must be capable of communicating at the correct data rate.

The digital controller 124 also implements the command features of the message sets encoded in the protocols. Commands are usually incorporated into the protocol as additional data elements. For example, in TDMA, according to ASTM V6 there are controls for the LEDs and beeper which are part of the data fields transmitted to each transponder when properly addressed. Similarly, an IAG compatible transponder may also respond to LCD, LED or beeper commands. In response to certain commands or interrogation signals, data provided by the host computer 126 or the memory 132 is formatted by the protocol controller 130 according to the protocol structure selected in accordance with the present invention.

The memory 132 is connected at the end of a receive path within the digital controller 124. The memory 132 may provide long term storage of standard data for identifying the vehicle transponder 100 to the reader 112. Examples of the data stored in the memory 132 can include the transponder ID, vehicle type, registration number, vehicle identification number, operator identification and license number, vehicle weight, maximum load weight capacity, cargo information such as the bill of lading, ports of entry and the like. Table 1 illustrates an example of the data fields associated with identification within the three protocols.

TABLE 1

| Field | Agency Field Size, bits | | | | Comment |
|---|---|---|---|---|---|
| | IAG | | | | |
| Description | IAG | I-Pass | TDMA | T21 | Note: X = not used. |
| Header | 3 | | X | 12 | Incompatible headers |
| Public ID Protocol | X | | 1 | X | PIP |
| Public ID Link Entry | | | 1 | | PILE |

TABLE 1-continued

| Field | Agency Field Size, bits | | | | Comment |
|---|---|---|---|---|---|
| | IAG | | | | |
| Description | IAG | I-Pass | TDMA | T21 | Note: X = not used. |
| Tag Type | 3 | | 2 | | Incompatible Tag Type coding |
| Application ID | 3 | | X | | |
| Group ID | 7 | | X | | |
| Agency ID | 7 | | 6 | 16 | Different allocation systems |
| Manufacturer | X | | 5 | X | |
| Public Serial No | 24 | | 23 | 32 | IAG Serial numbers are combined with Agency ID. TDMA Serial numbers are combined with Manufacturer ID, PIP, PILE, and Tag Type. T21 serial numbers are unique. |
| Private ID | X | | 32 | X | Internal knowledge, never transmitted |

Thus, the transponder 100 may store multiple, different identities (IDs), each ID being dependant and associated with a protocol. Thus a multi protocol transponder 100 may be registered with various relevant agencies responsible for CVO and/or ETTM systems. A vehicle with a multi protocol transponder 100 may register its transponder ID as a TDMA transponder for purposes of Weigh Station Bypass in interstate commerce, and register the same transponder with an IAG agency under an IAG transponder ID for purposes of tolling and also register the transponder with a T21 tolling agency all independently.

Figure 3:
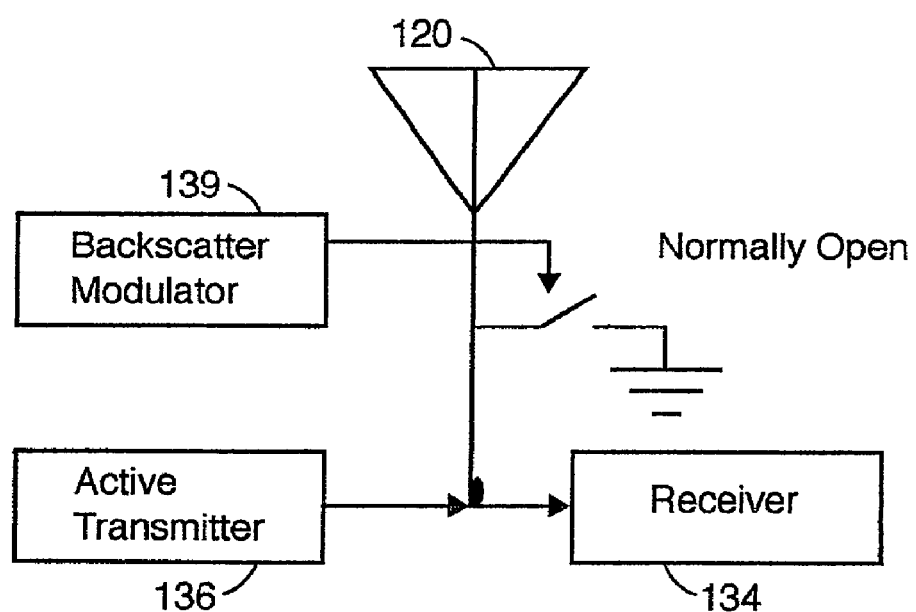
FIG. 3 is a simplified diagram illustrating a shared antenna for Backscatter and Active Transmission.

Protocol formatted digital data generated by the protocol controller 130 is directed to one of two transmit controllers 136,138 associated with the protocol identified. The preferred transponder 100 is capable of both active transmission or modulated backscatter transmission. In the active transmission mode, the formatted digital data is utilized to modulate a transmit oscillator carrier wave to convert the data from a digital-to-analog (D/A) format. The active transmission controller 136 produces a second (typically amplitude modulated) RF voltage signal power amplified for transmission to the transmit/receive switch 140. The transmit/receive switch 140, which is controlled in accordance with the protocol structure, routes the second RF voltage signal to the antenna 120. The antenna 116 then converts the second RF voltage signal to radiated energy which is thereafter transmitted to the reader 112. Alternately, for example if the protocol structure identified is T21, transmission of the second RF signal by the modulated backscatter transmission controller 138 and a backscatter modulator 139 is performed by modulated backscatter of a continuous wave generated by reader 102 as is well known in the art. Reflection modulation acts to cut the reception sensitivity of the antenna 120 by altering the antenna impedance, typically by switching the antenna termination between a matching impedance an applied short circuit (FIG. 3).

While a single transponder antenna 120 is shown, multiple antennae may be used for example to separately receive and transmit or to transmit by active or backscatter methods.

Advantageously, use of a multi protocol transponder 100 described herein with such readers is transparent to the reader.

While the transponder 100 may hold IDs unique to each protocol it may implement, the individual protocol IDs cannot necessarily define a unique ID for the transponder 100 when considered in a global context. A convenient and universal means is required to uniquely identify the transponder, independently of the protocol used. This single unique universal serial number may be incorporated into the transponder 100 for inclusion in a data field for transmission to a reader 102, if requested. The system of individual protocol IDs is convenient for agencies to operate independently from one another; however, this becomes more cumbersome once the agencies begin to exchange account information in a move to achieve interoperability. In such a case, it is convenient to reference the transponder 100 by a single unique identity common to all agencies regardless of protocol. Subsequent record transactions and maintenance could utilize the single unique universal ID.

Preferably, the single universal unique ID may be constructed independently of the other protocol IDs and satisfy the standards requirements such as defined in IEEE P1455. However, the single unique universal ID may be constructed by concatenating elements from each of the various protocol IDs. Within the IEEE P1455 standard, there is described a standard for numbering transponders that incorporates a Manufacturer's ID, Service Agency, and serial number which may be concatenated into a single unique universal ID:

| Service Agency: | 16 bits |
| Serial Number Type: | 4 bits |
| Manufacturer Identification: | 16 bits |
| Serial Number: | 20 bits |
| Total | 56 bits |

The multi protocol transponder 100 herein described may be used in both Toll and CVO systems. In Toll operations, it is important to localize vehicles by localizing transponders mounted in consistent positions on vehicles and eliminate confusion between adjacent or closely spaced vehicles. For CVO operations, it is important to detect every commercial vehicle as it nears a by-pass station and determine of the vehicle should be allowed to pass or not in time to provide the operator with appropriate instructions. CVO operations are typically conducted under a "Wide Area" mode protocol, where the vehicle location is not critical as long as the vehicle's transponder ID is captured for reference. Toll operations are done within a confined physical area so as to reduce any confusion as to which vehicle transponder is being addressed.

The operating characteristics of transponders and protocols are selected to match the primary application. Transponders designed for CVO use are generally designed to provide Wide Area coverage with relatively limited control over the downlink or uplink parameters of the RF protocol. Transponders designed for Toll, on the other hand, are designed to provide precise control of either the uplink or downlink parameters, such as to provide exact transponder location. A transponder that is capable of reacting to both Wide Area and localized protocols, using appropriate IDs for each operation, is therefore ideally suited for CVO operations that also require Toll operations.

CVO operations are nationally implemented in a compatible manner in the TDMA Wide Area mode of ASTM V6, whereas Toll systems tend to be regionally governed. A multi protocol transponder implementing the Wide Area protocol and several regional protocols (eg. T21, IAG, Lane Based ASTM V6) can provide multi functionality in many geographical areas.

Some Toll applications require time-consuming reader and vehicle communications and processing including confirmation that the processing has applied to specific vehicles as they transit a control point. For example, in a Smart Card Tolling system, it may be necessary to identify the Smart Card, the vehicle class, the Smart Card Cash Balance, perform a mutual authentication between the Smart Card and RSE, calculate the debit amount, start the debit process on the Smart Card, and await the debit confirmation and then correlate the above information with a physical vehicle presence as it passes through a toll location. The physical correlation is required so that enforcement means can distinguish between vehicles that carry Smart Cards and have been successfully debited from those vehicles that do not carry Smart Cars or have not been successfully debited. In existing Wider Area systems, the localizing functions are performed by separate equipment, typically designed to provide angle of arrival calculation by phase comparisons.

A transponder with both Wide Area and Lane Based protocols is ideal for implementing these applications without the need for an external locator subsystem. The Wide Area protocol can be used to initiate the applications processes, using a common ID for reference, and a localized Lane Based transaction can be used to close the transaction. The common ID can be the single unique universal ID as discussed or, it can use the ID associated with the local protocol to simplify system integration.

In the current invention, TDMA Wide Area protocol of ASTM V6 may be used with a localized protocol for such a system (eg. TDMA Lane Based ASTM V7, T21, IAG). Both T21 and IAG protocols are well suited to localization of the transponder. IAG provides localization by providing very strict control of the downlink RF margins, while T21 provides localization by virtue of the rapid attenuation of link margin as a function of range caused by the backscatter characteristics.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

We claim:

1. A multi protocol transponder for a communications network operative according to a communications protocol from a plurality of communications protocols under which the transponder is operative, the transponder comprising:

means for receiving a first RF signal transmitted according to the communications protocol;

means for sequentially identifying the communications protocol from the first RF signal;

means for executing the identified communications protocol to generate a second RF signal; and means for transmitting the second RF signal according to the identified communications protocol, wherein:

said means for transmitting comprises:

a transmit antenna;

backscatter means for transforming the second RF signal to radiated energy by modulated backscatter; and active transmission means for transforming the second RF signal to radiated energy by active transmission, and the means for executing the identified communications protocol having means for selecting either the backscatter means or the active transmission means for operation in response to the identified communications protocol.

2. The transponder of claim 1 wherein the means for receiving comprises a receive antenna, the transmit antenna and receive antenna being one in the same, and wherein the transponder further includes a switch to disable the means for receiving during operation of the means for transmitting.

3. The transponder of claim 1 wherein each of the plurality of communications protocols includes a threshold trigger level of radiated energy to activate each of the protocols and wherein the means for sequentially identifying comprising:
means for detecting the level of radiated energy of the first RF signal.

4. The transponder of claim 3 wherein the means for identifying further includes:
means for testing the first RF signal for communications protocol indicators for each of the protocols triggered by the radiated energy detected.

5. The transponder of claim 4 wherein the means for testing comprises:
means for demodulating and converting the first RF signal to a digital signal; and
means for decoding the digital signal to identify communications protocol indicators.

6. The transponder of claim 1 further comprising means for storing digital data in a memory accessible to the means for executing the identified communications protocol, wherein the second RF signal being based at least in part on the data.

7. The transponder of claim 6 wherein the data comprises a protocol dependent identity respectively associated with each of the plurality of communications protocols.

8. The transponder of claim 7 wherein the data comprises a single unique universal identification code identifying the transponder independently of the plurality of communications protocols.

9. The transponder of claim 6 wherein the data comprises a single unique universal identification code identifying the transponder independently of the plurality of communications protocols.

10. A multi protocol transponder for a communications network operative according to a communications protocol from a plurality of communications protocols under which the transponder is operative, the transponder comprising:
means for receiving a first RF signal transmitted according to the communications protocol;
means for sequentially identifying the communications protocol from the first RF signal;
means for executing the identified communications protocol to generate a second RF signal; and
means for transmitting the second RF signal according to the identified communications protocol;
wherein the plurality of communications protocols comprises at least one communications protocol selected from the group of protocols comprising public Title 21 protocol, public TDMA Wide Area protocol, public TDMA Lane Based protocol, and proprietary IAG protocol.

11. The transponder of claim 10 wherein the communications protocol indicators comprise:
for the public Title 21 protocol, the presence of valid Manchester Data and an encoded Title 21 interrogation message;
for either of the public TDMA protocols, the presence of valid Manchester Data and an appropriate Frame Control Message; and
for the proprietary IAG protocol, the presence of an IAG trigger condition detected twice in succession in the span of 40 mSecs or less and in the absence of an intervening Title 21 interrogation message.

12. The transponder of claim 11 wherein the threshold level comprises:
for the public TDMA Wide Area protocol, about −30 dBm;
for the public TDMA Lane Based protocol, about −22 dBm;
for the public Title 21 protocol, about −22 dBm; and
for the proprietary IAG protocol, about −10 dBm.

13. A multi protocol transponder for a communications network operative according to a communications protocol from a plurality of communications protocols under which the transponder is operative, the transponder comprising:
means for receiving a first RF signal transmitted according to the communications protocol, the first RF signal comprising a set of RF signals;
means for sequentially identifying the communications protocol from the first RF signal;
means for executing the identified communications protocol to generate a second RF signal; and
means for transmitting the second RF signal according to the identified communications protocol.

14. A method for operating a multi protocol transponder in a communications network for reader-transponder communications operating according to a communications protocol from a plurality of communications protocols under which the transponder is operable, the method comprising the steps of:
receiving and transforming radiated energy to a first RF signal;
identifying the communications protocol sequentially from the first RF signal;
executing the identified communications protocol to generate a second RF signal;
transmitting the second RF signal according to the identified communications protocol, wherein:
the step of transmitting the second RF signal comprises:
selectively, in response to the identified communications protocol:
transforming the second RF signal to radiated energy by modulated backscatter; or
transforming the second RF signal to radiated energy by active transmission.

15. The method of claim 14 further comprising the step of disabling the means for receiving during operation of the means for transmitting.

16. The method of claim 14 wherein each of the plurality of communications protocols includes a threshold trigger level of radiated energy to activate the protocols and wherein the step of identifying the communications protocol comprises the steps of:
detecting the level of radiated energy of the first RF signal;
if the level of radiated energy detected exceeds the threshold trigger level for a communications protocol, testing the first RF signal for communications protocol indicators for each protocol triggered by the radiated energy detected.

17. The method of claim 16 wherein the step of testing comprises the steps of:

demodulating and converting the first RF signal to a digital signal; and decoding the digital signal to identify communications protocol indicators.

18. The method of claim 14 including the step of storing in a memory accessible to the means for executing a protocol dependent identity respectively associated with each of the plurality of communications protocols and the second RF signal being based at least in part on the protocol dependant identity.

19. The method of claim 18 including the step of storing in a memory accessible to the means for executing a single unique universal identification code identifying the transponder independent of the plurality of communications protocols and the second RF signal being based at least in part on single unique universal identification code.

20. The method of claim 14 including the step of storing in a memory accessible to the means for executing a single unique universal identification code identifying the transponder independent of the plurality of communications protocols and the second RF signal being based at least in part on single unique universal identification code.

21. A method for operating a multi protocol transponder in a communications network for reader-transponder communications operating according to a communications protocol from a plurality of communications protocols under which the transponder is operable, the method comprising the steps of:

receiving and transforming radiated energy to a first RF signal;

identifying the communications protocol sequentially from the first RF signal;

executing the identified communications protocol to generate a second RF signal;

transmitting the second RF signal according to the identified communications protocol wherein the plurality of communications protocols comprises at least one communications protocol selected from the group of protocols comprising public Title 21 protocol, public TDMA Wide Area protocol, public TDMA Lane Based protocol, and proprietary IAG protocol.

22. The method of claim 21 wherein the communications protocol indicators comprise:

for the public Title 21 protocol, the presence of valid Manchester Data and an encoded Title 21 interrogation message; and for either of the public TDMA protocols, the presence of valid Manchester Data and an appropriate Frame Control Message;

for the proprietary IAG protocol, the presence of an IAG trigger condition detected twice in succession in the span of 40 mSecs or less and in the absence of an intervening Title 21 interrogation message.

23. The method of claim 22 wherein the threshold level comprises:

for the public TDMA Wide Area protocol, about −30 dBm;

for the public TDMA Lane Based protocol, about −22 dBm;

for the public Title 21 protocol, about −22 dBm; and for the proprietary IAG protocol, about −10 dBm.

* * * * *